(12) United States Patent
Suzuki

(10) Patent No.: US 7,693,647 B2
(45) Date of Patent: Apr. 6, 2010

(54) INTAKE AIR AMOUNT CALCULATING SYSTEM AND METHOD OF INTERNAL COMBUSTION ENGINE

(75) Inventor: Yusuke Suzuki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 133 days.

(21) Appl. No.: 11/914,338

(22) PCT Filed: Nov. 30, 2006

(86) PCT No.: PCT/IB2006/003415

§ 371 (c)(1),
(2), (4) Date: Nov. 13, 2007

(87) PCT Pub. No.: WO2007/063396

PCT Pub. Date: Jun. 7, 2007

(65) Prior Publication Data

US 2008/0196487 A1 Aug. 21, 2008

(30) Foreign Application Priority Data

Dec. 1, 2005 (JP) .............................. 2005-348209

(51) Int. Cl.
*F02D 45/00* (2006.01)
*G01F 1/68* (2006.01)
(52) U.S. Cl. ...................... 701/113; 123/491; 73/114.34
(58) Field of Classification Search ......... 701/102–104, 701/113, 114; 73/114.31, 114.34, 204.11, 73/204.16, 204.23, 204.26; 123/491, 494; 702/53, 116, 133, 183, 185
See application file for complete search history.

(56) References Cited

U.S. PATENT DOCUMENTS

| | | | | |
|---|---|---|---|---|
| 5,717,136 A | * | 2/1998 | Aoi et al. .................. | 73/204.26 |
| 6,481,428 B1 | | 11/2002 | Makki et al. | |
| 6,644,104 B2 | * | 11/2003 | Muto et al. .............. | 73/114.34 |
| 6,658,931 B1 | * | 12/2003 | Plumb et al. ............. | 73/204.15 |
| 6,925,866 B2 | * | 8/2005 | Watanabe et al. ........ | 73/204.26 |
| 6,978,667 B2 | * | 12/2005 | Hosoya .................... | 73/114.34 |
| 7,069,139 B2 | * | 6/2006 | Muto et al. ................. | 701/104 |
| 7,178,388 B2 | * | 2/2007 | Okuda et al. ............. | 73/114.34 |
| 7,248,960 B2 | * | 7/2007 | Ikemoto et al. ............. | 701/114 |

FOREIGN PATENT DOCUMENTS

DE 41 20 388 A1 12/1992
DE 195 37 466 4/1997

(Continued)

*Primary Examiner*—Stephen K Cronin
*Assistant Examiner*—Johnny H Hoang
(74) *Attorney, Agent, or Firm*—Oblon, Spivak, McClelland, Maier & Neustadt, L.L.P.

(57) ABSTRACT

When it is predicted that an engine is going to be started in the near future, a heater portion of an air flow meter is energized so as to be heated in advance. Prior to the pre-heating, an intake air temperature is sensed by a temperature sensing portion of the air flow meter. After completion of start-up of an intake air temperature sensor, a difference between the intake air temperature sensed by the intake air temperature sensor and the previously sensed intake air temperature is obtained. When the difference is above a predetermined value, it is judged that the intake air temperature sensor or the air flow meter is in an abnormal condition.

9 Claims, 9 Drawing Sheets

FOREIGN PATENT DOCUMENTS

| | | |
|---|---|---|
| DE | 101 50 510 A1 | 7/2002 |
| GB | 2 256 930 | 12/1992 |
| JP | 61 97528 | 5/1986 |
| JP | 63 45508 | 2/1988 |
| JP | 3-56417 | 8/1991 |
| JP | 5 180057 | 7/1993 |
| JP | 6 281484 | 10/1994 |
| JP | 7 224712 | 8/1995 |
| JP | 10 306740 | 11/1998 |
| JP | 2000-241222 A | 8/2000 |
| JP | 3475853 | 9/2003 |
| JP | 2004-176570 | 6/2004 |
| JP | 2005-264891 | 9/2005 |

* cited by examiner

INTAKE AIR AMOUNT CALCULATING SYSTEM AND METHOD OF INTERNAL COMBUSTION ENGINE

BACKGROUND OF THE INVENTION

1. Field of the Invention

The invention relates to intake air amount calculating system and method for calculating an intake air amount of an internal combustion engine.

2. Description of the Related Art

An intake air amount calculating system having an air flow meter using a hot wire is known. In this system, electric power supplied to a heating resistor is controlled so as to maintain a constant temperature difference between a resistor for measuring the intake air temperature and the heating resistor. Then, the intake air amount is calculated based on the power supplied to the heating resistor. After start of energization of the heating resistor, it takes some time for the air flow meter to provide desired characteristics. Accordingly, the intake air amount cannot be calculated based on the output of the air flow meter until the desired characteristics are provided.

An intake air amount calculating system having an air flow meter that adopts the micromachine technology is known, as disclosed in, for example, Japanese Patent No. 3475853. In this air flow meter, resistors for measuring the intake air temperature, heating resistors and other components are in the form of thin films. The air flow meter, which uses a microchip device, has a small heat capacity, and can be started up in a short time.

There is also known a system for calculating the amount of air that flows into cylinders, using respective outputs of an intake air temperature sensor, intake manifold air pressure sensor and so forth, as disclosed, for example, in JP-A-5-180057.

When water droplets or ice is deposited on a sensing portion of the air flow meter, however, the air flow meter is not able to accurately calculate the intake air amount even if start-up of the air flow meter is completed.

To calculate the intake air amount with high accuracy, it is essential to correct the intake air amount measured by the air flow meter, based on the intake air temperature. While the air flow meter using the microchip device as described above can be started up in a short time, it takes some time to complete start-up of the intake air temperature sensor. Therefore, even if start-up of the air flow meter is completed, the intake air amount must be corrected based on an estimated intake air temperature until start-up of the intake air temperature sensor is completed, which may result in a situation that the intake air amount cannot be calculated with high accuracy.

SUMMARY OF THE INVENTION

It is a first object of the invention to heat an air flow meter in advance when start of an internal combustion engine is predicted, so as to accurately determine the intake air amount immediately after start of the engine even if water droplets or ice is deposited on the air flow meter. It is a second object of the invention to use an output of a temperature sensing portion incorporated in an air flow meter for temperature-based correction of the intake air amount until start-up of an intake air temperature sensor is completed, thereby to calculate the intake air amount with high accuracy even before completion of start-up of the intake air temperature sensor.

A first aspect of the invention is concerned with an intake air amount calculating system for calculating an intake air amount of an internal combustion engine. This system includes an air flow meter that is disposed in an intake passage of the engine and comprises a microchip device and a heater portion, and measures the intake air amount, a start predicting unit that predicts start of the engine, and a pre-heating unit that causes the heater portion to be heated in advance when the start predicting unit predicts start of the engine.

A second aspect of the invention is concerned with an intake air amount calculating system for calculating an intake air amount of an internal combustion engine. This system includes an air flow meter that is disposed in an intake passage of the engine and comprises a microchip device, a heater portion and a temperature sensing portion, and measures the intake air amount, an intake air temperature sensor that is disposed in the intake passage and senses an intake air temperature, a start predicting unit that predicts start of the engine, an intake air temperature sensor activating unit that activates the intake air temperature sensor when the start predicting unit predicts start of the engine, a pre-heating unit that causes the heater portion to be heated in advance when the start predicting unit predicts start of the engine, an intake air temperature acquiring unit that acquires the intake air temperature sensed by the temperature sensing portion, prior to pre-heating of the heater portion, and a calibrating unit that calibrates characteristics of the temperature sensing portion if a difference between the intake air temperature acquired by the intake air temperature acquiring unit and the intake air temperature sensed by the intake air temperature sensor is equal to or below a predetermined value, after completion of start-up of the intake air temperature sensor.

In the second aspect of the invention, the intake air amount calculating system may further include an abnormality judging unit that judges that the air flow meter or the intake air temperature sensor is in an abnormal condition if the difference between the intake air temperature acquired by the intake air temperature acquiring unit and the intake air temperature sensed by the intake air temperature sensor is above the predetermined value, after completion of start-up of the intake air temperature sensor.

A third aspect of the invention is concerned with an intake air amount calculating system of an internal combustion engine. This system includes an air flow meter that is disposed in an intake passage of the engine and comprises a microchip device, a heater portion and a temperature sensing portion, and measures the intake air amount, an intake air temperature sensor that is disposed in the intake passage and senses an intake air temperature, a start detecting unit that detects start of the engine, an intake air temperature sensor activating unit that activates the intake air temperature sensor when the start detecting unit detects start of the engine, a heating unit that causes the heater portion to be heated when the start detecting unit detects start of the engine, an intake air temperature acquiring unit that acquires the intake air temperature sensed by the temperature sensing portion, prior to heating of the heater portion by the heating unit, and an intake air amount correcting unit that corrects the intake air amount measured by the air flow meter, based on the intake air temperature acquired by the intake air temperature acquiring unit, during a period between start of the engine and completion of start-up of the intake air temperature sensor.

According to the first aspect of the invention, when start of the engine is predicted by the start predicting unit, the heater portion of the air flow meter is heated in advance by the pre-heating unit. Thus, even in the case where water droplets or ice is deposited on the air flow meter, the water droplets or ice is vaporized before start of the engine. This makes it possible for the air flow meter to measure the intake air amount immediately after start of the engine, without being affected by the deposited water droplets or ice.

According to the second aspect of the invention, when start of the engine is predicted by the start predicting unit, the heater portion of the air flow meter is heated in advance, and the intake air temperature sensor is started. After completion of start-up of the intake air temperature sensor, a difference between the intake air temperature sensed by the temperature sensing portion of the air flow meter prior to pre-heating thereof and the intake air temperature sensed by the intake air temperature sensor is obtained. If the difference is equal to or below the predetermined value, characteristics of the temperature sensing portion are calibrated. Thus, the system according to this aspect of the invention provides a new function of calibrating the characteristics of the temperature sensing portion of the air flow meter upon start-up of the air flow meter.

According to one form of the second aspect of the invention, the difference between the intake air temperature sensed by the temperature sensing portion of the air flow meter prior to pre-heating thereof and the intake air temperature sensed by the intake air temperature sensor is obtained after completion of start-up of the intake air temperature sensor. If the difference is above the predetermined value, it is judged that the air flow meter or the intake air temperature sensor is in an abnormal condition. Thus, the system provides a new function of detecting a failure of the air flow meter or intake air temperature sensor upon start-up of the air flow meter.

According to the third aspect of the invention, when start of the engine is detected by the start detecting unit, the heater portion of the air flow meter is heated, and the intake air temperature sensor is started. During a period between start of the engine and completion of start-up of the intake air temperature sensor, the intake air amount measured by the air flow meter is corrected based on the intake air temperature sensed by the temperature sensing portion of the air flow meter prior to heating of the heater portion. Thus, even before completion of start-up of the intake air temperature sensor, the intake air amount can be corrected based on the actually sensed intake air temperature, so that the intake air amount can be calculated with high accuracy.

A fourth aspect of the invention is concerned with a method of calculating an intake air amount of an internal combustion engine. This method includes a step of predicting start of the engine, and a step of pre-heating a heater portion included in an air flow meter that is disposed in an intake passage of the engine and measures the intake air amount when start of the engine is predicted.

A fifth aspect of the invention is concerned with a method of calculating an intake air amount of an internal combustion engine. This method includes a step of predicting start of the engine, a step of starting an intake air temperature sensor disposed in an intake passage of the engine when start of the engine is predicted, a step of pre-heating a heater portion included in an air flow meter that is disposed in the intake passage and measures the intake air amount when start of the engine is predicted, a step of acquiring an intake air temperature sensed by a temperature sensing portion included in the air flow meter prior to pre-heating, and a step of calibrating characteristics of the temperature sensing portion if a difference between the acquired intake air temperature and the intake air temperature sensed by the intake air temperature sensor is equal to or below a predetermined value, after completion of start-up of the intake air temperature sensor.

In the fifth aspect of the invention, it may be judged that the air flow meter or the intake air temperature sensor is in an abnormal condition if the above-mentioned difference is above the predetermined value, after completion of start-up of the intake air temperature sensor.

A sixth aspect of the invention is concerned with a method of calculating an intake air amount of an internal combustion engine. This method includes a step of detecting start of the engine, a step of starting an intake air temperature sensor that is disposed in an intake passage of the engine and sensed an intake air temperature, when start of the engine is detected, a step of heating a heater portion included in an air flow meter that is disposed in the intake passage and measures the intake air amount, when start of the engine is detected, a step of acquiring the intake air temperature sensed by a temperature sensing portion included in the air flow meter, prior to heating of the heater portion, and a step of correcting the intake air amount measured by the air flow meter, based on the acquired intake air temperature, during a period between start of the engine and completion of start-up of the intake air temperature sensor.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
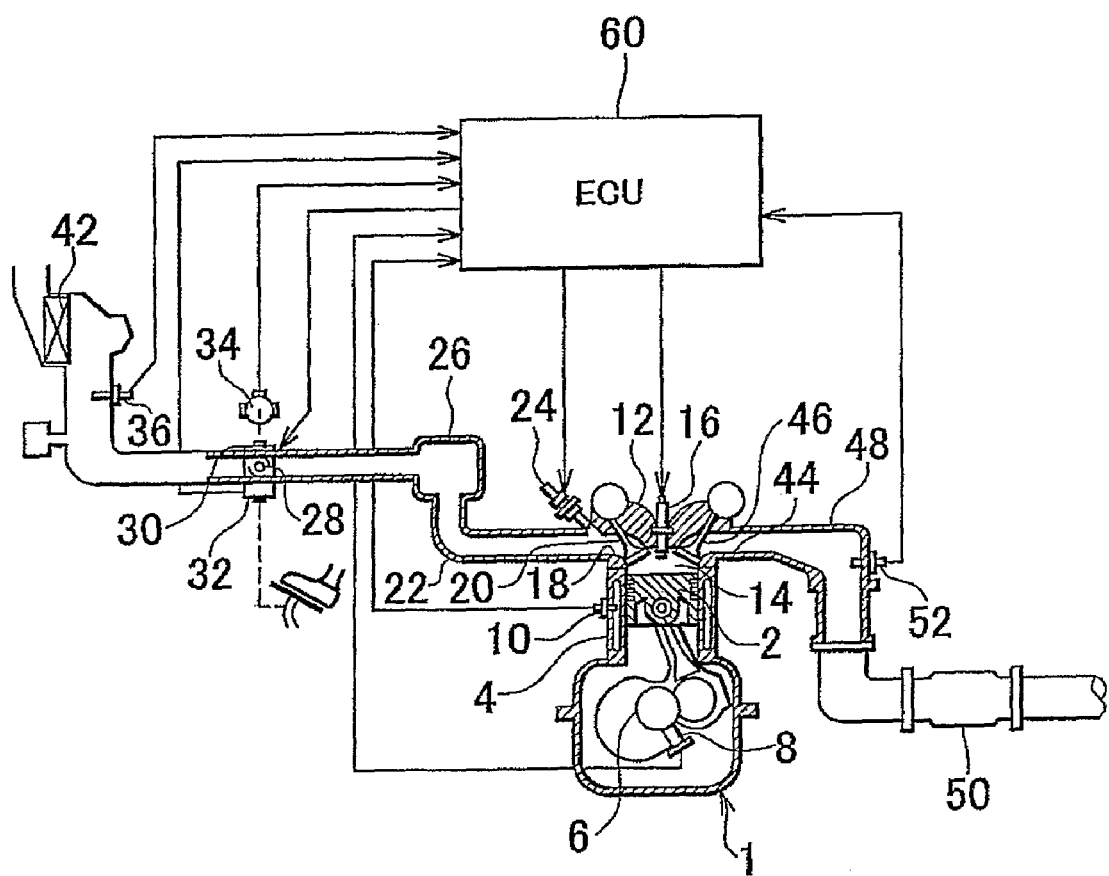
FIG. 1 is a view used for explaining the construction of a system according to a first embodiment of the invention.

Some embodiments of the invention will be described with reference to the drawings. In the drawings, the same reference numerals are used for identifying the same or corresponding elements, of which repeated explanation will not be provided.

Initially, the first embodiment of the invention will be described. FIG. 1 is a view used for explaining the configuration of a system according to the first embodiment of the invention. The system of the first embodiment includes an internal combustion engine 1. The engine 1 has a plurality of cylinders. In FIG. 1, only one of the plural cylinders is illustrated.

The engine 1 includes a cylinder block 4 that contains pistons 2. The pistons 2 are connected to a crankshaft 6 via a crank mechanism. A crank angle sensor 8 is provided in the vicinity of the crankshaft 6. The crank angle sensor 8 is arranged to measure the rotational angle of the crankshaft 6. The cylinder block 4 is provided with a coolant temperature sensor 10 for measuring the coolant temperature.

A cylinder head 12 is mounted on top of the cylinder block 4. A combustion chamber 14 is formed between the top face of each of the pistons 2 and the cylinder head 12. The cylinder head 12 is provided with an ignition plug or spark plug 16 for igniting an air-fuel mixture in the combustion chamber 14.

The cylinder head 12 has an intake port 18 that communicates with the combustion chamber 14. An intake valve 20 is mounted in a portion of the cylinder head 12 which connects the intake port 18 with the combustion chamber 14. An intake passage 22 is connected to the intake port 18. An injector 24 is provided in the vicinity of the intake port 18 for injecting fuel into the intake passage 22 close to the intake port 18. A surge tank 26 is provided in the intake passage 22.

A throttle valve 28 is disposed in the intake passage 22 upstream of the surge tank 26. The throttle valve 28 is an electronically controlled valve that is driven by a throttle motor 30. The throttle valve 28 is adapted to be driven based on the accelerator pedal position or pedal travel detected by an acceleration stroke sensor 32. A throttle opening sensor 34 is provided in the vicinity of the throttle valve 28. The throttle opening sensor 34 senses the throttle opening. A micromachine-type air flow meter 36 is disposed in the intake passage 22 upstream of the throttle valve 28. As will be described in detail, the air flow meter 36 measures the intake air amount or flow rate of intake air. An air cleaner 42 is disposed upstream of the air flow meter 36.

Also, the cylinder head 12 has an exhaust port 44 that communicates with the combustion chamber 14. An exhaust valve 46 is mounted in a portion of the cylinder head 12 which connects the exhaust port 44 with the combustion chamber 14. An exhaust passage 48 is connected to the exhaust port 44. A catalyst 50 for purifying exhaust gas is provided in the exhaust passage 48. An air/fuel ratio sensor 52 for measuring the exhaust air/fuel ratio is disposed in the exhaust passage 48 upstream of the catalyst 50.

The system of the present embodiment includes an ECU (Electronic Control Unit) 60 serving as a control device The ignition plug 16, injector 24, throttle motor 30 and other components are connected to the output side of the ECU 60. The crank angle sensor 6, coolant temperature sensor 10, throttle opening sensor 34, air flow meter 36, air/fuel ratio sensor 52 and other sensors or components are connected to the input side of the ECU 60. The ECU 60 performs control of the overall engine, including fuel injection control and ignition timing control, based on the outputs of the sensors. The ECU 60 also calculates the engine speed based on the output of the crank angle sensor 6. The ECU 60 also calculates the intake air amount of the engine 1 by correcting the intake air amount measured by the air flow meter 36 based on the intake air temperature.

Figure 2:
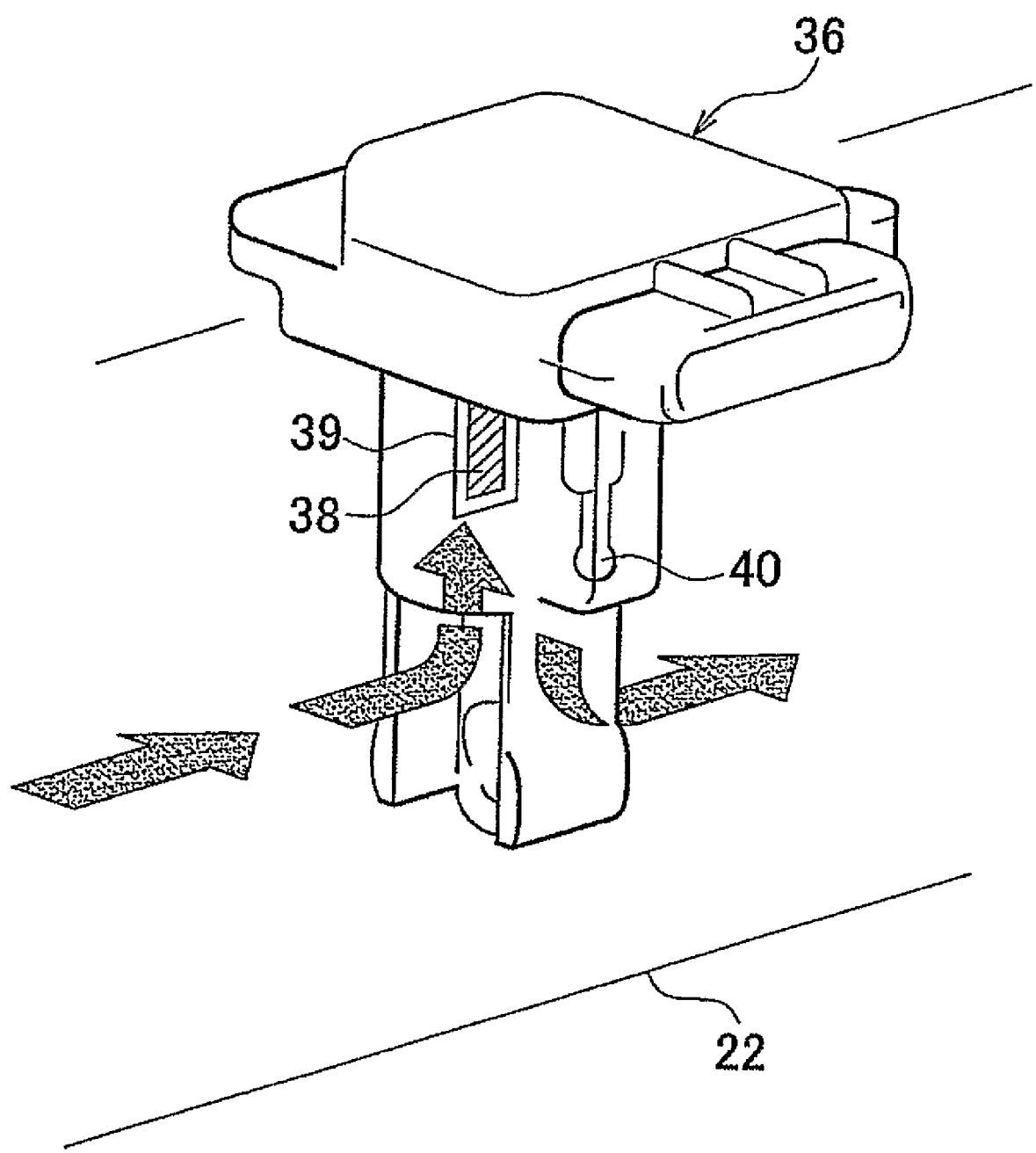
FIG. 2 is a view showing an air flow meter shown in FIG. 1 and its surroundings.

FIG. 2 illustrates the air flow meter 36 and its surroundings. As shown in FIG. 2, the air flow meter 36 includes a flow-rate sensing element 38 acting as an intake-air-amount sensing portion. The flow-rate sensing element 38 is in the form of a microchip device. The flow-rate sensing element 38 is supported by a mounting member 39. Also, the air flow meter 36 includes an intake air temperature sensor 40 of a thermistor type.

Figure 3A:
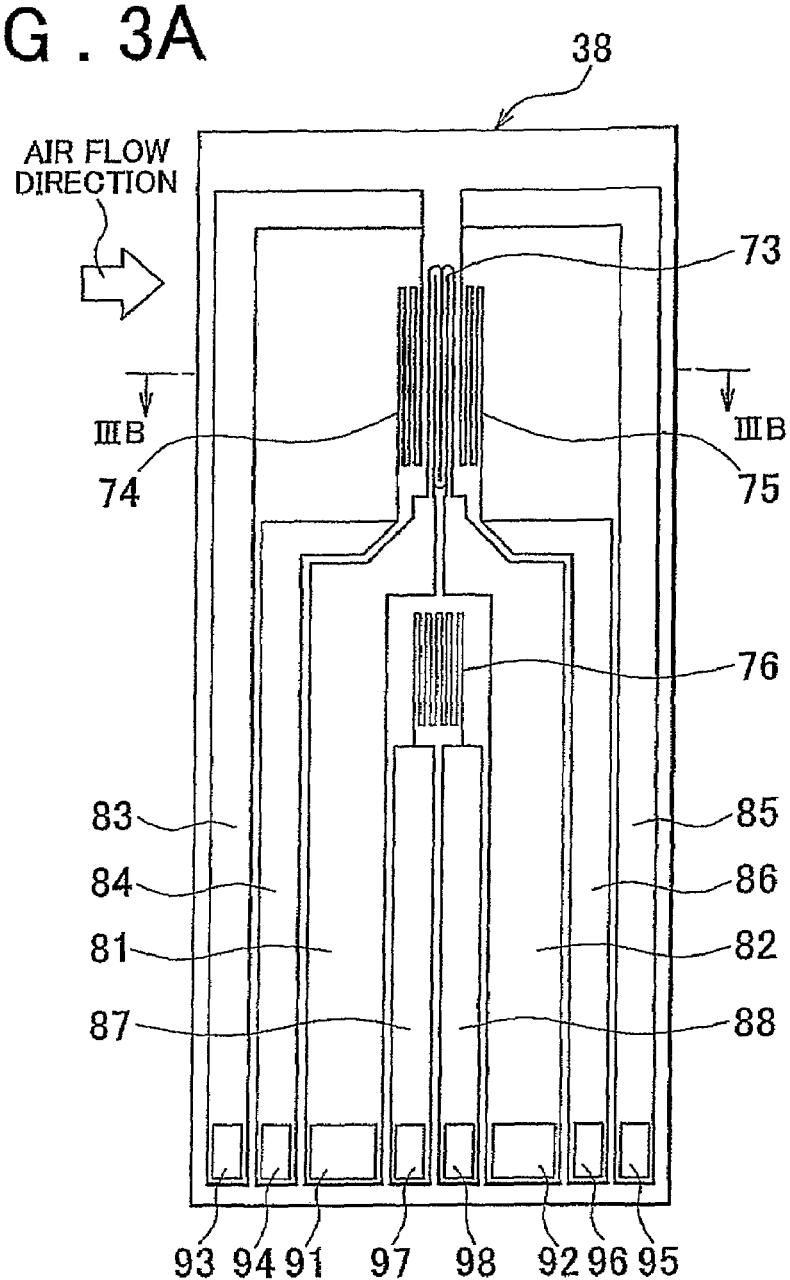
FIG. 3A and FIG. 3B are views showing a flow-rate sensing element shown in FIG. 2.
Figure 3B:
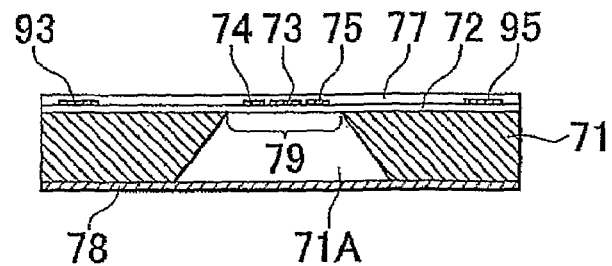
Figure 4:
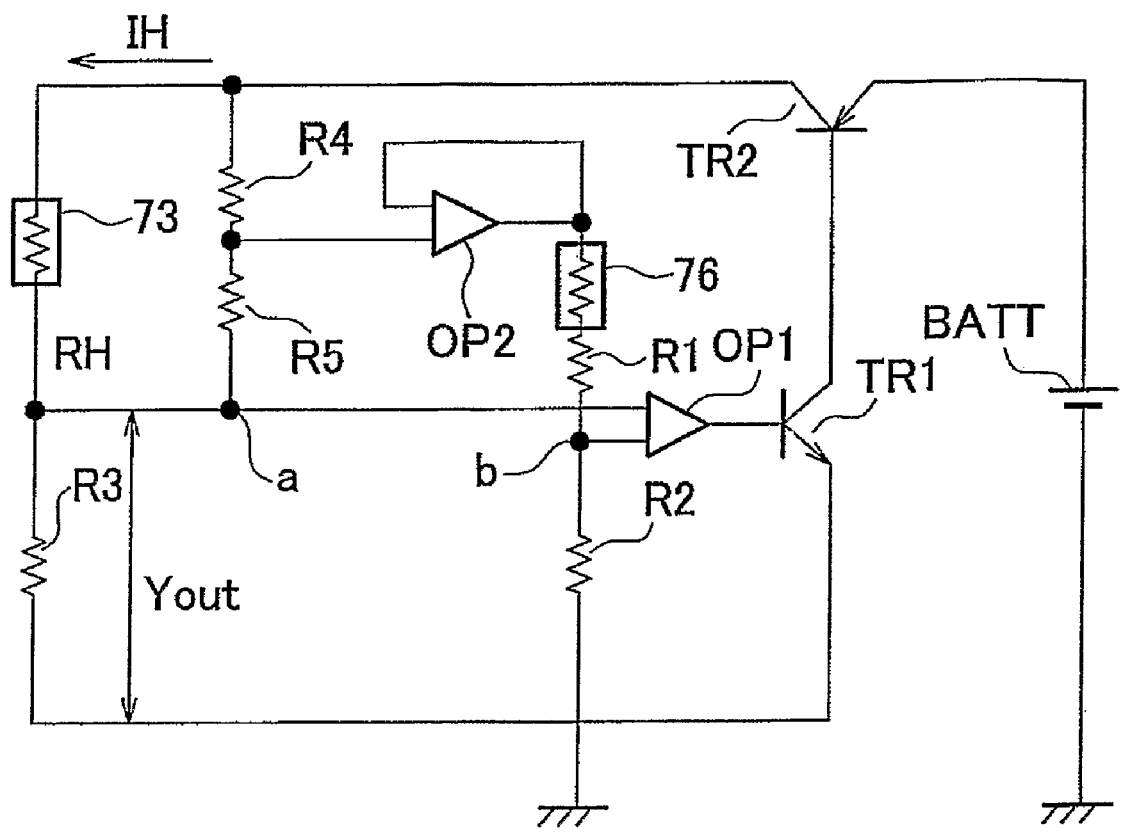
FIG. 4 is a circuit diagram showing a bridge circuit serving as an intake-air-amount detecting circuit.

FIG. 3A and FIG. 3B illustrate the flow-rate sensing element 38 shown in FIG. 2. More specifically, FIG. 3A is a front view of the flow-rate sensing element 38 as viewed in a direction perpendicular to the flow direction of air, and FIG. 3B is a cross-sectional view taken along IIIB-IIIB of FIG. 3A. FIG. 4 illustrates a bridge circuit acting as an intake-air-amount detecting circuit. As shown in FIG. 3B, a support film 72, which consists of a silicon nitride film and has a thickness of about 0.5 μm, is formed on a surface of a flat substrate 71 in the form of a silicon substrate. A heating resistor 73 and temperature sensing resistors 74, 75 are formed on the support film 72. Each of the heating resistor 73 and temperature sensing resistors 74, 75 consists of a heat sensitive resistor film formed of, for example, platinum, and has a thickness of about 0.1 μm. The heating resistor 73 is connected to external electrodes 91, 92 via wiring patterns 81, 82. The temperature sensing resistor 74 is connected to external electrodes 93, 94 via wiring patterns 83, 84. The temperature sensing resistor 75 is connected to external electrodes 95, 96 via wiring patterns 85, 86.

A fluid temperature sensing portion 76 is formed on the support film 72. The fluid temperature sensing portion 76 consists of a heat sensitive resistor film formed of, for example, platinum, and has a thickness of about 0.1 μm. The fluid temperature sensing portion 76 is connected to external electrodes 97, 98 via wiring patterns 87, 88 as lead patterns.

A protective film 77 in the form of a silicon nitride film having a thickness of about 0.5 μm is formed on the heating resistor 73, temperature sensing resistors 74, 75 and wiring patterns 81 to 88.

In addition, a protective film 78 is formed on the back surface of the substrate 71. A cavity 71A is formed in a portion of the back surface of the substrate 71 from which the protective film 78 is removed. The cavity 71A provides a diaphragm 79 used for detecting the flow rate of intake air. The flow-rate sensing element 38 is positioned such that the diaphragm 79 is exposed to the flow of air.

The heating resistor 73 and the fluid temperature sensing portion 76 provide parts of the detecting circuit as shown in FIG. 4. In FIG. 4, fixed resistors R1-R5, operational amplifiers OP1, OP2, transistors TR1, TR2 and a power supply BATT are illustrated. The detecting circuit is adapted to control heating current IH of the heating resistor 73 so that the electric potentials measured at point "a" and point "b" in FIG. 4 become equal to each other. As the flow rate of air increases, namely, as the amount of intake air increases, the amount of heat transferred from the heating resistor 73 to the air increases, and the heating current IH is increased accordingly. Thus, the air flow meter 36 determines the intake air amount based on the heating current IH. On the other hand, the flow direction of air is determined by measuring outputs corresponding to the temperatures of the temperature sensing resistors 74, 75 and comparing the outputs with each other by a circuit (not shown). If there is no need to determine the air flow direction, a single temperature measuring resistor may be provided.

Features of the first embodiment will be described. In the system of the first embodiment, the intake air amount is measured by the air flow meter 36 having the flow-rate sensing element 38 in the form of a microchip device. The length of time required for starting up the air flow meter 36 is significantly shorter than that of a conventional air flow meter using hot-wire.

In the case where water droplets or ice is deposited on the flow-rate sensing element 38, the air flow meter 36 is not able to measure the intake air amount even if its start-up is promptly completed.

In the first embodiment, therefore, the heating resistor 73 and temperature sensing resistors 74, 75 of the air flow meter 36 are energized at the time when it is predicted that the engine is going to be started soon. The prediction is made, for example, when the driver opens the door, the driver sits on the driver's seat, or the driver inserts a key into a cylinder. With the resistors 73, 74, 75 thus energized, the air flow meter 36 is heated in advance, or pre-heated, prior to start of the engine, so that influences of the water droplets or ice deposited can be eliminated. Namely, even in the case where water droplets or ice is deposited on the flow-rate sensing element 38 as an intake-air-amount sensing portion of the air flow meter 36 before the engine is started, the water droplets or ice can be vaporized through pre-heating of the air flow meter 36. This makes it possible for the air flow meter 36 to measure the intake air amount immediately after start of the engine.

Also, in the first embodiment, the intake air temperature is sensed by the fluid temperature sensing portion 76 prior to pre-heating of the air flow meter 36. After start-up of the intake air temperature sensor 40 is completed, the intake air temperature TAFM sensed by the fluid temperature sensing portion 76 and the intake air temperature TA sensed by the intake air temperature sensor 40 are compared with each other. If a difference between the intake air temperature TAFM and the intake air temperature TA is large, a failure of the air flow meter 36 or intake air temperature sensor 40 can be detected.

In the first embodiment, if the above-mentioned difference between the intake air temperature TAFM and the intake air temperature TA is small, and the engine 1 is not started even though pre-heating has been performed for a sufficient time for vaporizing the deposited water droplets or ice, pre-heating of the air flow meter 36 is finished. As a result, the power consumption of the battery can be suppressed or reduced.

Figure 5A:
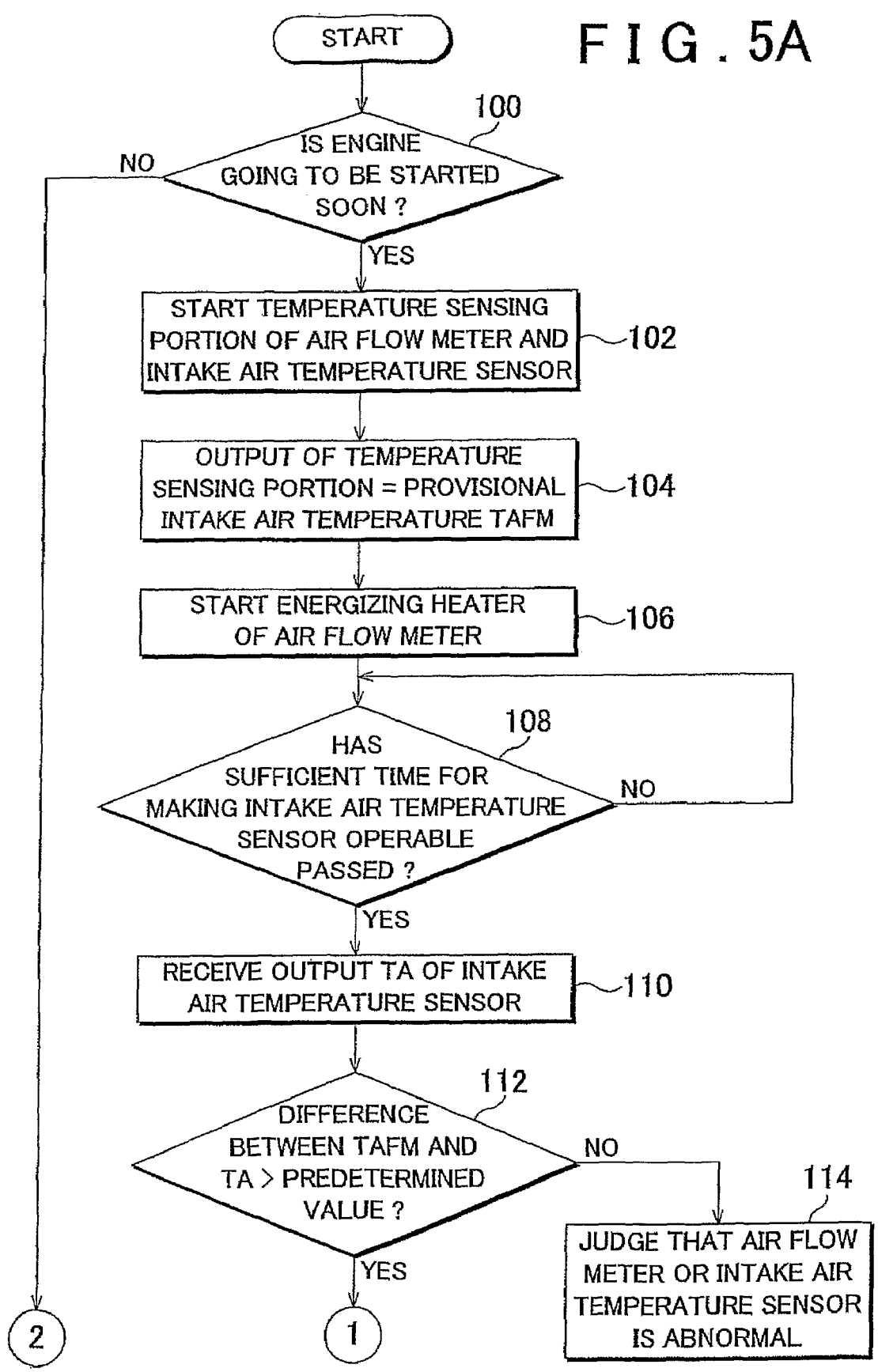
FIG. 5A and FIG. 5B are flowcharts illustrating a routine executed by ECU in the first embodiment of the invention.
Figure 5B:
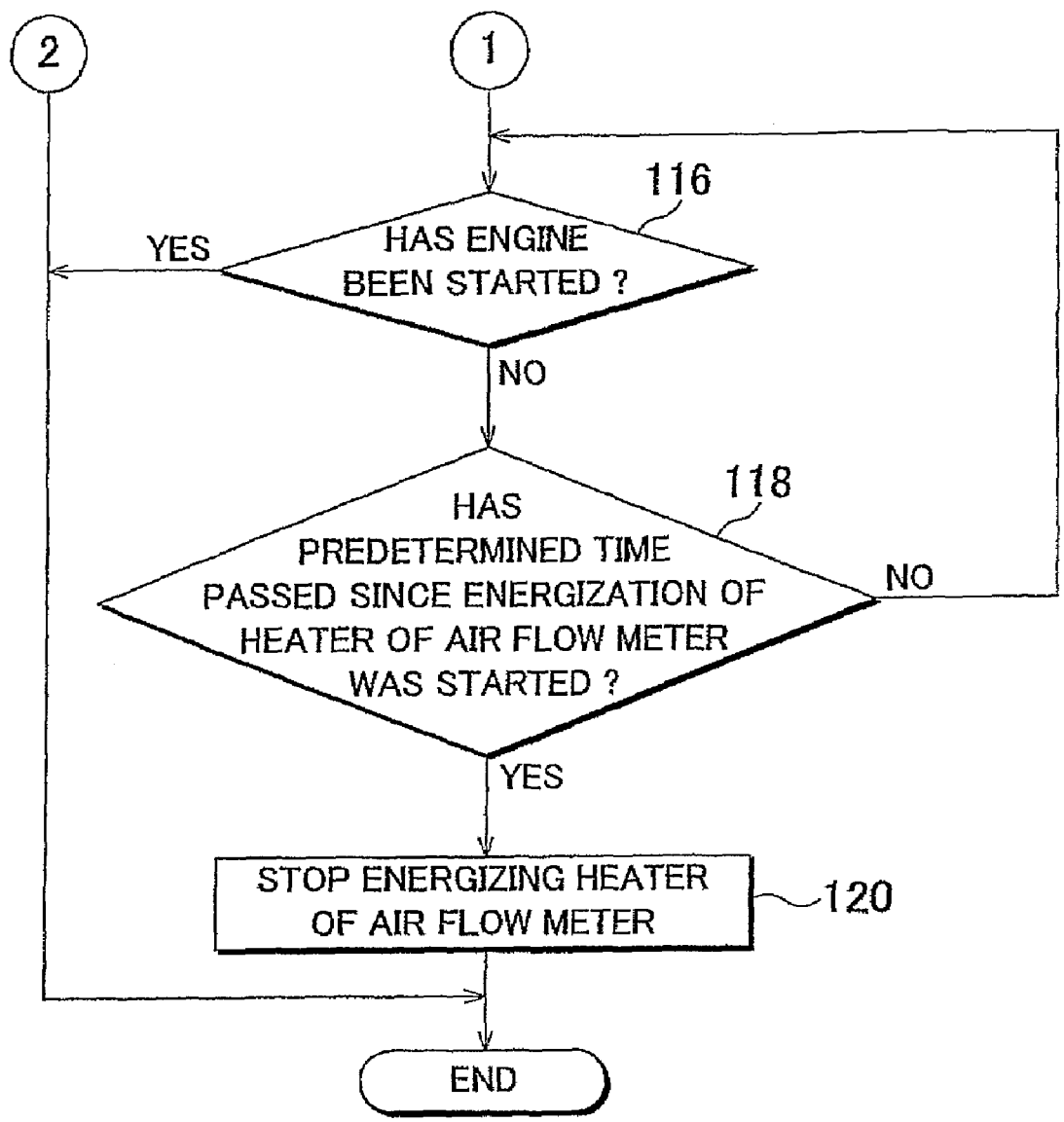

A specific process performed according to the first embodiment will be described. FIG. 5A and FIG. 5B are flowcharts illustrating a routine executed by the ECU 60 in the first embodiment.

According to the routine shown in FIG. 5A and FIG. 5B, it is initially determined whether there is a possibility of starting the engine in the near future (step 100). Here, it may be determined that there is a possibility of starting the engine in the near future when a sensor or sensors (not shown) detect opening of the door of the driver's seat, or the driver sitting on the driver's seat, or insertion of the key into the cylinder by the driver. If it is determined in step 100 that there is no possibility of starting the engine in the near future, namely, if the engine has already been started, or the above-mentioned sensors (not shown) make no detection, the routine of FIG. 5A and FIG. 5B is once finished.

On the other hand, if it is determined in step 100 that there is a possibility of starting the engine in the near future, namely, if any of the sensors (not shown) detects any of the above-mentioned events, the fluid temperature sensing portion 76 acting as a temperature sensing portion of the air flow meter 36 and the intake air temperature sensor 40 are started (i.e., supplied with power) (step 102). While start-up of the fluid temperature sensing portion 76 is instantly completed, some length of time is required for starting up the intake air temperature 40. In step 102, the heating resistor 73 and temperature sensing resistors 74, 75 have not yet been energized. In the following description, the heating resistor 73 and temperature sensing resistors 74, 75 may be called "a heater portion 73, 74, 75" when appropriate.

Next, the output of the temperature sensing portion 76 is received, and the received output is taken as a provisional intake air temperature TAFM (step S104). In step 104, the temperature sensing portion 76 senses the intake air temperature in a condition in which the heating resistor 73 and temperature sensing resistors 74, 75 are not heated. Subsequently, the heater portion 73, 74, 75 of the air flow meter 36 is energized (i.e., supplied with power) (step 106). As a result, the air flow meter 36 is heated in advance (i.e., prior to start of the engine).

Next, it is determined whether the time required for enabling the intake air temperature sensor 40 to sense the intake air temperature, namely, a sufficient time for ensuring desired characteristics of the intake air temperature sensor 40, has passed since start-up of the intake air temperature sensor 40 was initiated in step S102 (step 108). If it is determined in step S108 that sufficient time has passed, the output intake air temperature TA of the intake air temperature 40 is received (step 110). Then, it is determined whether a difference between the output TAFM of the temperature sensing portion 76 received in step 104 and the output TA of the intake air temperature sensor 40 received in step 110 is above a predetermined value (step 112).

If it is determined in step 112 that the difference is above the predetermined value, it is judged that the air flow meter 36 or the intake air temperature sensor 40 is in an abnormal condition, and the vehicle driver is informed of the abnormality (step 114). More specifically, an alarm lamp is turned on, or alarm sound is generated.

On the other hand, if it is determined in step 112 that the difference is equal to or below the predetermined value, namely, if it is judged that the air flow meter 36 and the intake air temperature sensor 40 are in normal conditions, it is determined whether the engine has been started (step 116). If it is determined in step 116 that the engine has been started, the routine of FIG. 5A and FIG. 5B is finished. If it is determined in step 116 that the engine has not been started, it is determined whether a predetermined time has passed since energization of the heater portion 73, 74, 75 of the air flow meter 36 was initiated (step 118). The predetermined time is defined as a length of time that is sufficient for vaporizing water droplets or ice deposited on a surface of the sensing element of the air flow meter 36 in the case where condensation or icing occurs on the surface. If it is determined in step 118 that the predetermined time has passed, supply of power from the battery to the heater portion 73, 74, 75 of the air flow meter 36 is stopped (step 120). Stopping energization of the heater portion prevents waste of power of the battery.

According to the routine as shown in FIG. 5A and FIG. 5B, when it is judged that the engine is going to be started in the near future, the heater portion 73, 74, 75 of the air flow meter 36 is energized, as explained above. Thus, the air flow meter 36 is heated in advance prior to start of the engine. Since water droplets or ice deposited can be vaporized through pre-heating, the air flow meter 36 is able to measure the intake air amount immediately after the engine is started.

Also, after start-up of the intake air temperature sensor 40 is completed, an abnormality (or failure) of the air flow meter 36 or intake air temperature sensor 40 can be detected by comparing the intake air temperature TAFM sensed by the temperature sensing portion 76 prior to pre-heating with the intake air temperature TA sensed by the intake air temperature sensor 40. Thus, the system of this embodiment provides a new function of determining a failure of the air flow meter 36 or the intake air temperature sensor 40 upon start-up of the air flow meter 36.

If a difference between the intake air temperature TAFM and the intake air temperature TA is small, and the engine 1 is not started even though the air flow meter 36 has been heated in advance for a sufficient time, energization of the heater portion 73, 74, 75 is stopped, thereby to suppress or reduce waste of power of the battery.

While energization of the heater portion 73, 74, 75 is stopped if the engine 1 is not started even after a lapse of the predetermined time from start of energization of the heater portion 73, 74, 75 in the first embodiment, the heater portion 73, 74, 75 may continue to be energized if the battery has a sufficient amount of extra power. (This modification may also be applied to the second embodiment as described later.) In this case, the air flow meter 36 is able to calculate the intake air amount immediately after start of the engine even if it takes a long time from start of energization of the heater portion to start of the engine.

While the intake air temperature sensor 40 is mounted inside the air flow meter 36 in the first embodiment, the intake air temperature sensor 40 may be mounted outside the air flow meter 36. In this case, it is desirable to locate the intake air temperature sensor 40 in the vicinity of the air flow meter 36.

In the first embodiment, it may be regarded that execution of step 100 by the ECU 60 provides "start predicting unit" according to the first and second aspects of the invention, execution of step 102 provides "intake air temperature sensor activating unit" according to the second aspect of the invention, execution of step 104 provides "intake air temperature acquiring unit" according to the second aspect of the invention, execution of step 106 provides "pre-heating unit" according to the first and second aspects of the invention, and execution of steps 112, 114 provides "abnormality judging unit" according to the second aspect of the invention.

Figure 6A:
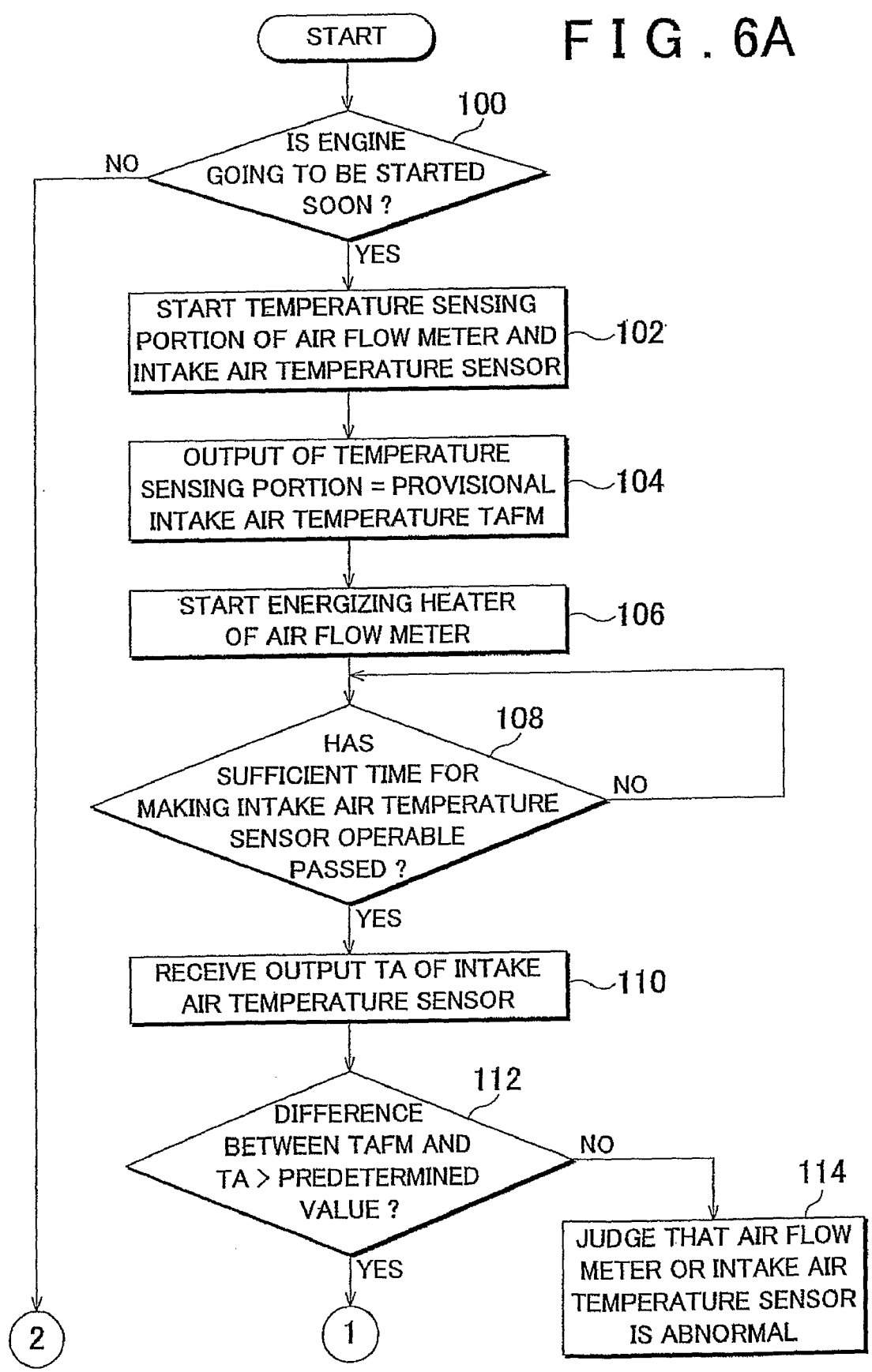
FIG. 6A and FIG. 6B are flowcharts illustrating a routine executed by ECU in a second embodiment of the invention.
Figure 6B:
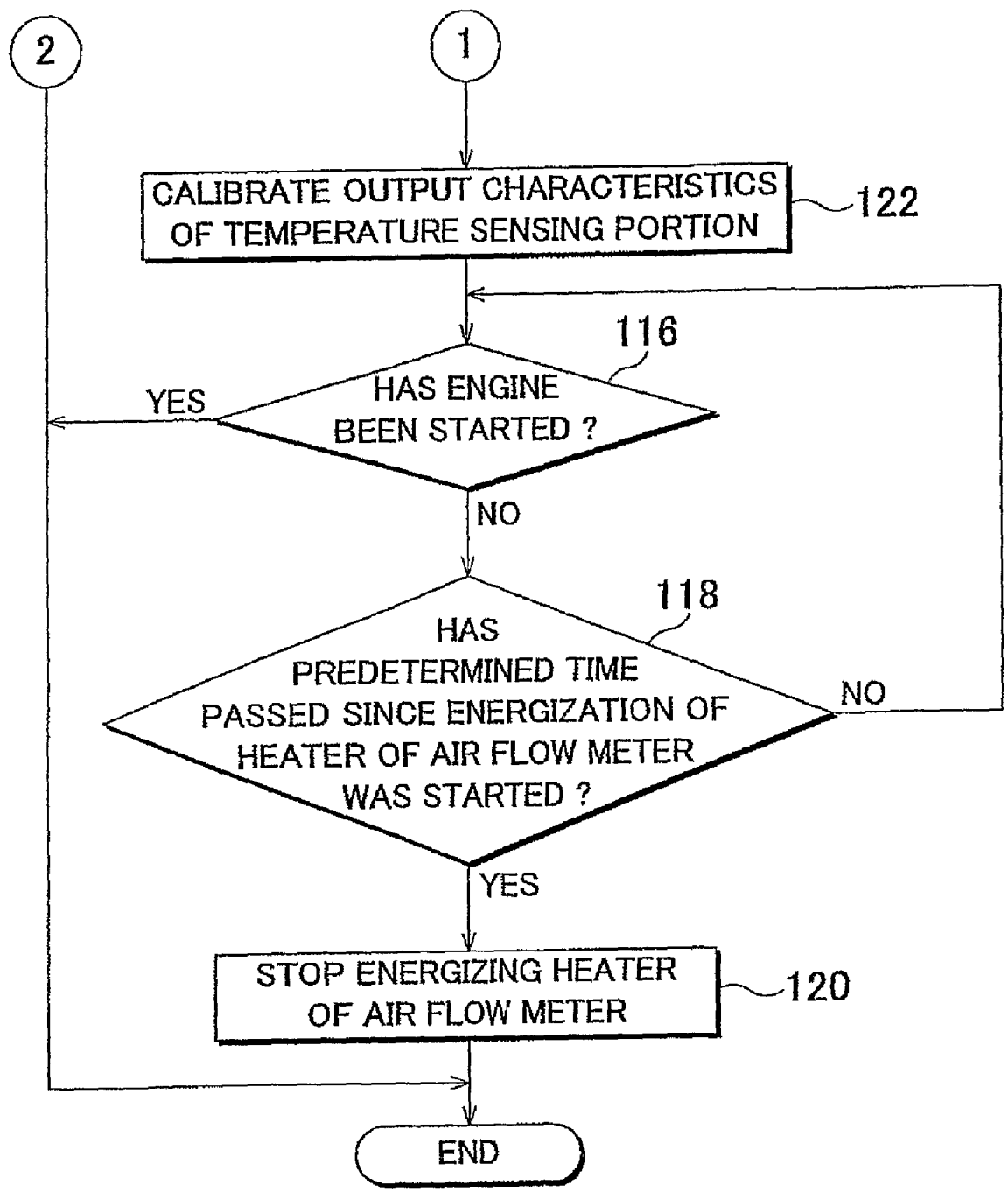

Referring next to FIG. 6A and FIG. 6B, the second embodiment of the invention will be described. The system of the second embodiment is realized by causing the ECU 60 to execute a routine of FIG. 6A and FIG. 6B as will be described later, using the hardware arrangement as shown in FIG. 1 to FIG. 4.

Features of the second embodiment will be described. In the first embodiment, when a difference between the intake air temperature TAFM sensed by the temperature sensing portion 76 and the intake air temperature TA sensed by the intake air temperature sensor 40 is small, the heater portion 73, 74, 75 of the air flow meter 36 is energized for the predetermined time. Namely, the air flow meter 36 is heated in advance at the time when start of the engine 1 is predicted, so that water droplets or ice deposited on the flow-rate sensing element 38 of the air flow meter 36 can be vaporized.

In the second embodiment, when a difference between the intake air temperature TAFM and the intake air temperature TA is small, the characteristics of the temperature sensing portion 76 are calibrated based on the difference. Thereafter, pre-heating of the air flow meter 36 is continued for a sufficient time for vaporizing the water droplets or ice deposited, and the pre-heating is finished if the engine 1 is not started, as in the first embodiment.

A specific process performed according to the second embodiment will be described. FIG. 6A and FIG. 6B are flowcharts illustrating a routine executed by the ECU 60 in the second embodiment.

According to the routine as shown in FIG. 6A and FIG. 6B, step 100 through step 112 that are identical with those of the routine of the first embodiment as shown in FIG. 5A and FIG. 5B are executed. If it is determined in step 112 that a difference between the intake air temperature TAFM and the intake air temperature TA is above the predetermined value, it is judged that the air flow meter 36 or the intake air temperature sensor 40 is in an abnormal condition, and the vehicle driver is informed of the abnormality (step 114), as in the first embodiment.

On the other hand, if it is determined in step 112 that the difference is equal to or below the predetermined value, namely, if the air flow meter 36 and the intake air temperature 40 are judged to be in normal conditions, the output characteristics of the temperature sensing portion 76 are calibrated in accordance with the difference between the intake air temperature TAFM and the intake air temperature TA (step 122). More specifically, an offset of the output characteristics of the temperature sensing portion 76 from those of the intake air temperature sensor 40 is corrected. In step 122, the output characteristics of the intake air temperature sensor 40 are regarded as being true since the intake air temperature sensor 40 has higher reliability than the temperature sensing portion 76, and the output characteristics of the temperature sensing portion 76 are adjusted or calibrated so as to match with those of the intake air temperature sensor 40.

Subsequently, steps 116, 118, 120 are executed in the same manner as in the first embodiment.

According to the routine as shown in FIG. 6A and FIG. 6B, when a difference between the intake air temperature TAFM and the intake air temperature TA is small, the output characteristics of the temperature sensing portion 76 are calibrated in accordance with the difference, as explained above. Thus, the system of the second embodiment provides a new function of calibrating the output characteristics of the temperature sensing portion 76 upon start-up of the air flow meter 36, in addition to the effects provided in the first embodiment as described above.

In the second embodiment, it may be considered that execution of steps 112, 122 by the ECU 60 provides "calibrating unit" according to the second aspect of the invention.

Figure 7:
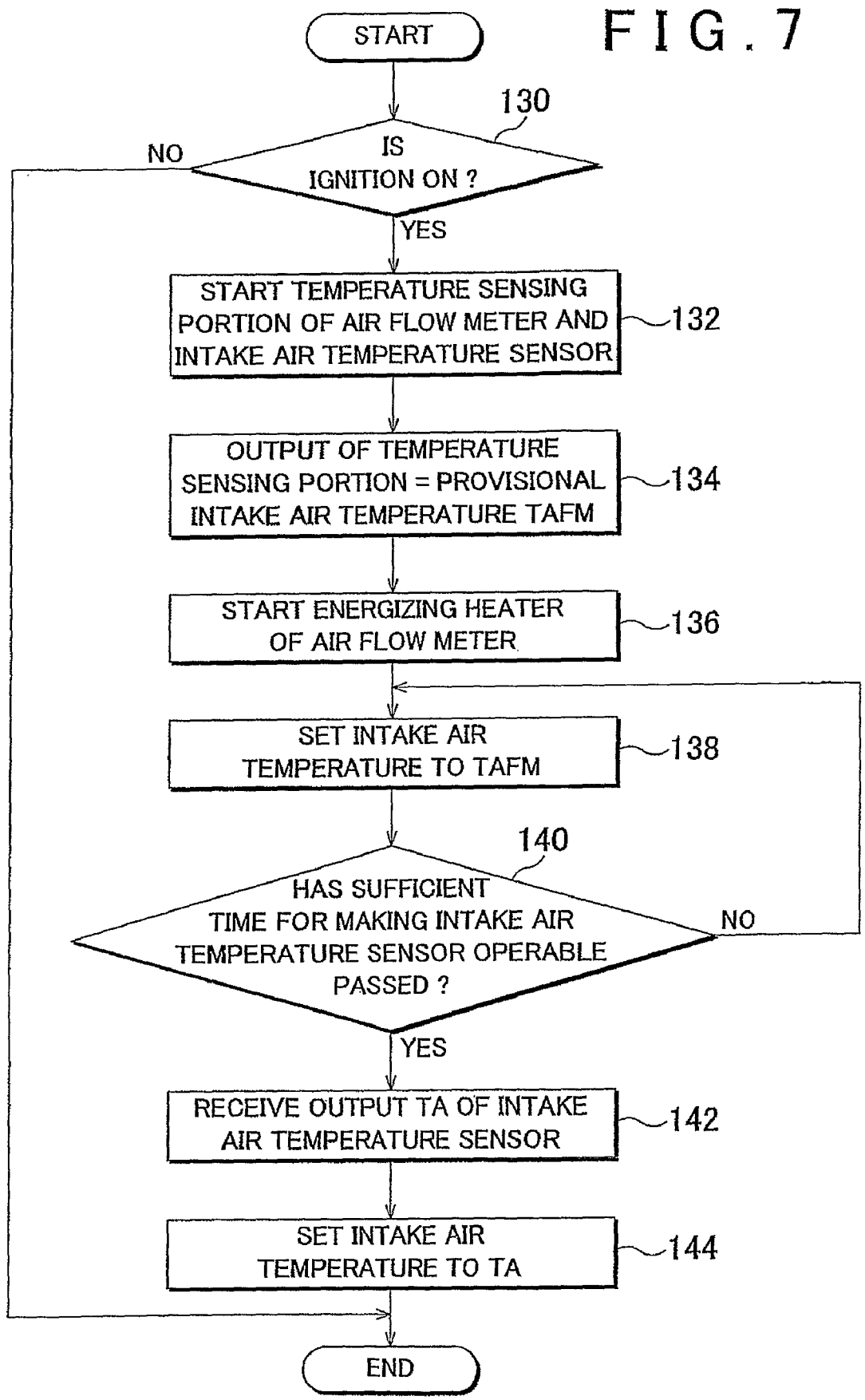
FIG. 7 is a flowchart illustrating a routine executed by ECU in a third embodiment of the invention.

Referring next to FIG. 7, the third embodiment of the invention will be described. The system of the third embodiment is realized by causing the ECU 60 to execute a routine of FIG. 7 as will be described later, using the hardware arrangement as shown in FIG. 1 to FIG. 4.

Features of the third embodiment will be explained. As described above, it is essential to correct the intake air amount measured by the air flow meter, based on the temperature, so as to calculate the intake air amount with high accuracy. While details of the temperature-based correction will not be explained herein, the temperature-based correction may be performed with reference to a map that defines the relationship between the intake air temperature and the intake air amount, or the temperature-based correction may be performed through calculations using a model. Also, the intake air amount measured by the air flow meter may be corrected in view of the intake air pressure and the engine speed, as well as the intake air temperature (as disclosed in, for example, JP-A-5-180057).

In the meantime, the air flow meter 36 using a microchip device as shown in FIGS. 2, 3A, 3B can start operating in a short time, but some length of time is required for completing start-up of the intake air temperature sensor 40. Therefore, even if start-up of the air flow meter 36 is completed, the intake air amount measured by the air flow meter 36 must be corrected based on an estimated intake air temperature until start-up of the intake air temperature sensor 40 is completed. In this case, the intake air amount may not be accurately calculated.

In the third embodiment, the intake air temperature TAFM is sensed by the temperature sensing portion 76 of the air flow meter 36 before the heater portion 73, 74, 75 of the air flow meter 36 is energized. Then, after completion of start-up of the air flow meter 36, the intake air amount is corrected based on the intake air temperature TAFM until start-up of the intake air temperature 40 is completed. After start-up of the intake air temperature sensor 40 is completed, the intake air amount is corrected based on the intake air temperature TA sensed by the intake air temperature sensor 40. Thus, after completion of start-up of the air flow meter 36, the intake air amount can be corrected based on the intake air temperature TAFM actually sensed by the temperature sensing portion 76 even in the case where start-up of the intake air temperature sensor 40 has not been completed. It is thus possible to calculate the intake air amount with high accuracy even in the case where start-up of the intake air temperature sensor 40 has not been completed.

A specific process performed according to the third embodiment will be explained. FIG. 7 is a flowchart illustrating a routine executed by the ECU 60 in the third embodiment.

According to the routine as shown in FIG. 7, it is initially determined whether the ignition is switched ON, namely, whether the engine is started (step 130). If it is determined in step 130 that the ignition is OFF, namely, if it is determined that the engine has not been started, the routine of FIG. 7 is once finished.

If it is determined in step 130 that the ignition is ON, namely, if it is determined that the engine is started, the fluid temperature sensing portion 76 as the temperature sensing portion of the air flow meter 36 and the intake air temperature sensor 40 are started (i.e., supplied with power) (step 132). While start-up of the fluid temperature sensing portion 76 is instantly completed, some length of time is required for starting up the intake air temperature sensor 40. In step 132, the heating resistor 73 and temperature sensing resistors 74, 75 as the heater portion of the air flow meter 36 have not yet been energized or supplied with power.

Next, the output of the temperature sensing portion 76 is received, and the received output is taken as a provisional intake air temperature TAFM (step 134). In step 134, the intake air temperature is sensed by the temperature sensing portion 76 in a condition in which the heating resistor 73 and temperature sensing resistors 74, 75 are not heated. Thereafter, the heater portion 73, 74, 75 of the air flow meter 36 is energized (i.e., supplied with power) (step 136). As a result, start-up of the intake-air-amount sensing portion of the air flow meter 36 is instantly completed.

Next, the intake air temperature TAFM acquired in step 134 is used as an intake air temperature as one of important control parameters of the engine 1 (Step 138). Thus, the ECU 60 is able to correct the intake air amount measured by the air flow meter 36, based on the intake air temperature TAFM.

Next, it is determined whether the time required for enabling the intake air temperature sensor 40 to adequately sense the intake air temperature, namely, a sufficient time for ensuring desired characteristics of the intake air temperature sensor 40, has passed since start-up of the intake air temperature sensor 40 is initiated in step 132 (step 140). If it is determined in step 140 that sufficient time has not passed, the control returns to step 138.

On the other hand, if it is determined in step 140 that sufficient time has passed, the output (intake air temperature) TA of the intake air temperature sensor 40 is received (step 142). Then, the intake air temperature TA received in step 142 is used as an intake air temperature as one of important control parameters of the engine 1 (step 144). Thus, the ECU 60 is able to correct the intake air amount measured by the air flow meter 36, based on the intake air temperature TA.

According to the routine as shown in FIG. 7, after start of the engine, the intake air temperature TAFM sensed by the temperature sensing portion 76 prior to energization of the heater portion 73, 74, 75 is used as the intake air temperature until start-up of the intake air temperature sensor 40 is completed, as explained above. Thus, even before completion of start-up of the intake air temperature sensor 40, the intake air amount measured by the air flow meter 36 is corrected based on the intake air temperature TAFM, so that the intake air amount can be calculated with high accuracy.

In the third embodiment, it may be regarded that execution of step 130 by the ECU 60 provides "start detecting unit" according to the third aspect of the invention, execution of step 132 provides "intake air temperature sensor activating unit" according to the third aspect of the invention, execution of step 134 provides "intake air temperature acquiring unit" according to the third aspect of the invention, execution of step 136 provides "heating unit" according to the third aspect of the invention, and execution of step 138 provides "intake air amount correcting unit" according to the third aspect of the invention.

While the invention has been described with reference to embodiments thereof, it is to be understood that the invention is not limited to the embodiments or constructions. To the contrary, the invention is intended to cover various modifications and equivalent arrangements. In addition, while the various elements of the embodiments are shown in various combinations and configurations, which are exemplary, other combinations and configurations, including more, less or only a single element, are also within the spirit and scope of the invention.

The invention claimed is:

1. An intake air amount calculating system for calculating an intake air amount of an internal combustion engine, comprising:

an air flow meter disposed in an intake passage of the engine that measures the intake air amount, the air flow meter comprising a microchip device, a heater portion and a temperature sensing portion;

an intake air temperature sensor disposed in the intake passage that measures an intake air temperature;

a start predicting unit that predicts start of the engine;

an intake air temperature sensor activating unit that activates the intake air temperature sensor when the start predicting unit predicts start of the engine;

a pre-heating unit that causes the heater portion to be heated in advance when the start predicting unit predicts start of the engine;

an intake air temperature acquiring unit that acquires the intake air temperature sensed by the temperature sensing portion, prior to pre-heating of the heater portion; and a calibrating unit that calibrates characteristics of the temperature sensing portion if a difference between the intake air temperature acquired by the intake air temperature acquiring unit and the intake air temperature sensed by the intake air temperature sensor is equal to or below a predetermined value, after completion of start-up of the intake air temperature sensor.

2. An intake air amount calculating system of an internal combustion engine according to claim 1, further comprising:

an abnormality judging unit that judges that the air flow meter or the intake air temperature sensor is in an abnormal condition if the difference between the intake air temperature acquired by the intake air temperature acquiring unit and the intake air temperature sensed by the intake air temperature sensor is above the predetermined value, after completion of start-up of the intake air temperature sensor.

3. An intake air amount calculating system of an internal combustion engine according to claim 1, wherein the intake air temperature sensor is disposed inside the air flow meter.

4. An intake air amount calculating system of an internal combustion engine according to claim 1, wherein the intake air temperature sensor is disposed outside the air flow meter.

5. An intake air amount calculating system of an internal combustion engine according to claim 1, wherein the calibrating unit calibrates the characteristics of the temperature sensing portion based on the difference between the intake air temperature acquired by the intake air temperature acquiring unit and the intake air temperature sensed by the intake air temperature sensor.

6. An intake air amount calculating system of an internal combustion engine, comprising:
  an air flow meter disposed in an intake passage of the engine that measures the intake air amount, the air flow meter comprising a microchip device, a heater portion and a temperature sensing portion;
  an intake air temperature sensor disposed in the intake passage that senses an intake air temperature;
  a start detecting unit that detects start of the engine;
  an intake air temperature sensor activating unit that activates the intake air temperature sensor when the start detecting unit detects start of the engine;
  a heating unit that causes the heater portion to be heated when the start detecting unit detects start of the engine;
  an intake air temperature acquiring unit that acquires the intake air temperature sensed by the temperature sensing portion, prior to heating of the heater portion by the heating unit; and
  an intake air amount correcting unit that corrects the intake air amount measured by the air flow meter, based on the intake air temperature acquired by the intake air temperature acquiring unit, during a period between start of the engine and completion of start-up of the intake air temperature sensor.

7. A method of calculating an intake air amount of an internal combustion engine, comprising:
  predicting start of the engine;
  starting an intake air temperature sensor disposed in an intake passage of the engine when start of the engine is predicted;
  pre-heating a heater portion included in an air flow meter that is disposed in the intake passage and measures the intake air amount, when start of the engine is predicted;
  acquiring an intake air temperature sensed by a temperature sensing portion included in the air flow meter, prior to pre-heating; and
  calibrating characteristics of the temperature sensing portion if a difference between the acquired intake air temperature and the intake air temperature sensed by the intake air temperature sensor is equal to or below a predetermined value, after completion of start-up of the intake air temperature sensor.

8. A method of calculating an intake air amount of an internal combustion engine according to claim 7, further comprising:
  judging that the air flow meter or the intake air temperature sensor is in an abnormal condition if said difference is above the predetermined value, after completion of start-up of the intake air temperature sensor.

9. A method of calculating an intake air amount of an internal combustion engine, comprising:
  detecting start of the engine;
  activating an intake air temperature sensor that is disposed in an intake passage of the engine and senses an intake air temperature, when start of the engine is detected;
  heating a heater portion included in an air flow meter that is disposed in the intake passage and measures the intake air amount, when start of the engine is detected;
  acquiring the intake air temperature sensed by a temperature sensing portion included in the air flow meter, prior to heating of the heater portion; and
  correcting the intake air amount measured by the air flow meter, based on the acquired intake air temperature, during a period between start of the engine and completion of start-up of the intake air temperature sensor.

* * * * *